United States Patent [19]
Garrard et al.

[11] Patent Number: 4,665,401
[45] Date of Patent: May 12, 1987

[54] MILLIMETER WAVE LENGTH GUIDANCE SYSTEM

[75] Inventors: John T. Garrard, St. Petersburg; Jack E. Gregg, Clearwater; Robert S. Roeder, Dunedin, all of Fla.

[73] Assignee: Sperry Corporation, New York, N.Y.

[21] Appl. No.: 195,809

[22] Filed: Oct. 10, 1980

[51] Int. Cl.$^4$ .............................................. G01S 13/72
[52] U.S. Cl. ........................................ 342/75; 342/62; 342/87; 342/128
[58] Field of Search .................. 343/5 VQ, 7.4, 7.3, 343/7.5, 14; 342/75, 85, 87, 128

[56] References Cited

U.S. PATENT DOCUMENTS

| | | | |
|---|---|---|---|
| 3,531,802 | 9/1970 | Brown et al. | 343/5 VQ X |
| 3,728,724 | 4/1973 | Alpers | 342/128 X |
| 3,793,634 | 2/1974 | Heller et al. | 343/7.4 |
| 3,921,169 | 11/1975 | Lazarchik et al. | 343/7.5 X |
| 3,924,235 | 12/1975 | Heller et al. | 343/7.4 |
| 4,115,776 | 9/1978 | Roeder et al. | 343/7.4 |
| 4,148,029 | 4/1979 | Quesinberry | 343/7.4 X |
| 4,150,379 | 4/1979 | Connors | 343/7.4 X |
| 4,152,700 | 5/1979 | Bodnar | 343/5 VQ |
| 4,200,871 | 4/1980 | Roeder et al. | 343/7.4 |
| 4,201,986 | 5/1980 | Ducrocq | 342/100 |
| 4,224,507 | 9/1980 | Gendreu | 343/7.4 X |

FOREIGN PATENT DOCUMENTS 953010 8/1974 Canada ........................... 343/5 VQ Primary Examiner—T. H. Tubbesing
Attorney, Agent, or Firm—Howard P. Terry

[57] ABSTRACT

A high frequency target seeking device, using a stabilized reflector antenna, performs range search and tracking functions and target angle search and tracking functions. A technique is provided for target range discrimination using several narrow band i.f. filters, also thereby improving signal-to-clutter ratio and signal-to-receiver noise ratio. Target search is accomplished with simultaneous range and antenna azimuth scanning, with the range bins and the antenna beam swept across the target. A multiplexer selects the range bin having signals indicative of the target. Target range tracking is accomplished by the multiplexer additionally automatically selecting range bins adjacent to the target's range bin and comparing their output signals. Antenna stabilization is accomplished utilizing signals from vehicle pitch, roll, and yaw rate sensors, and antenna elevation and azimuth rate and angle sensors. These signals are processed in the antenna control circuit according to predetermined relationships to provide the desired antenna stabilization.

17 Claims, 13 Drawing Figures

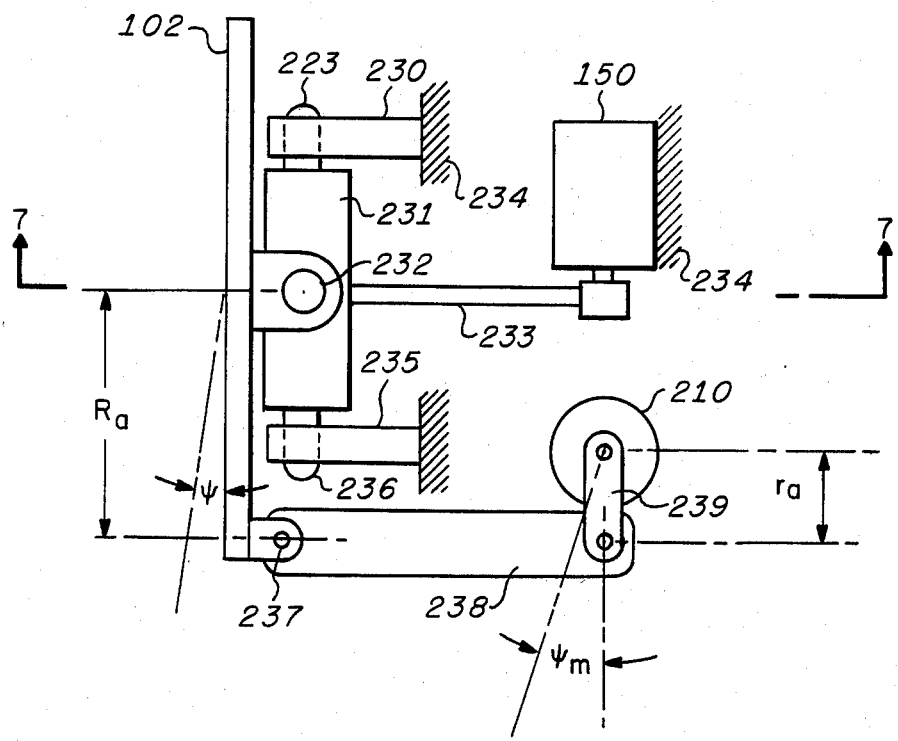
FIG.6.
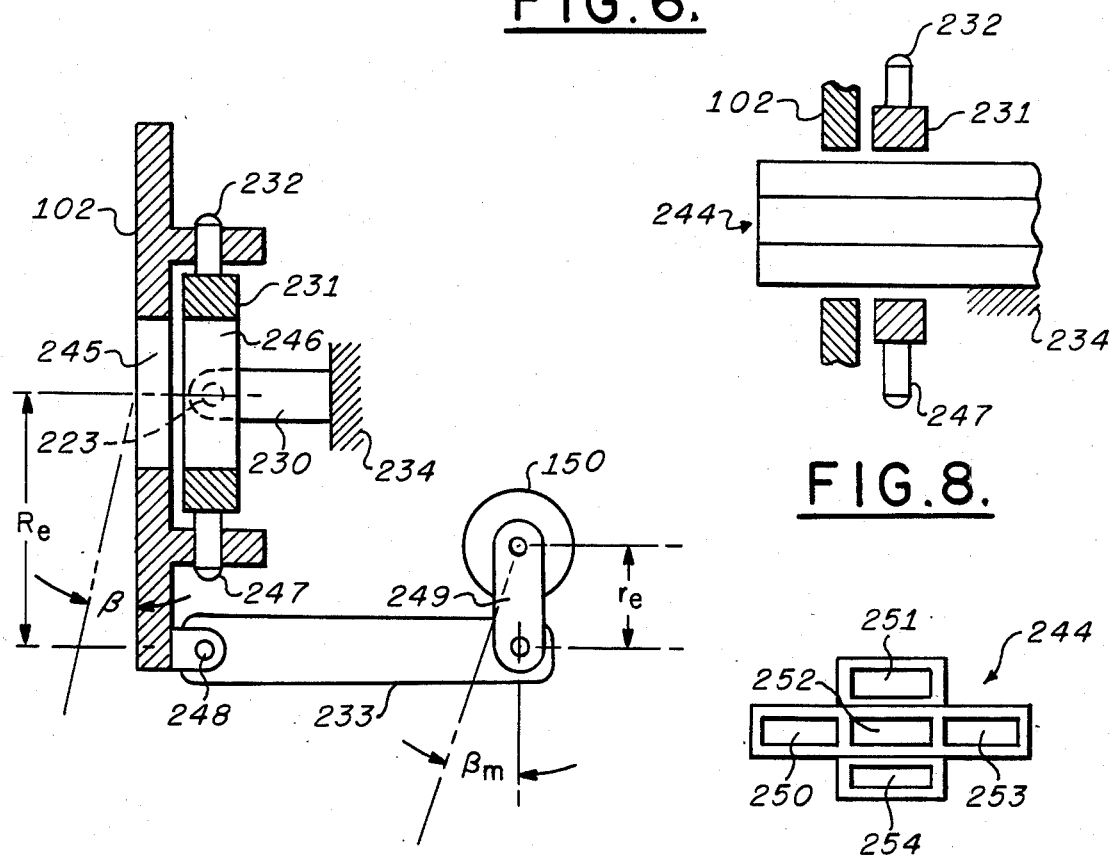
FIG.7.
FIG.8.
FIG.9.

| $f_1$ | $f_2$ | $f_a$ | $f_b$ |
|---|---|---|---|
| 0 | 0 | U | D |
| 1 | 0 | R | L |
| 0 | 1 | D | U |
| 1 | 1 | L | R |

MILLIMETER WAVE LENGTH GUIDANCE SYSTEM

BACKGROUND OF THE INVENTION

1. Field of the Invention

The invention pertains to stabilized target seeking devices and more particularly concerns active continuous-wave frequency-modulated millimeter wave radar concepts using multiple range bins for target detection and tracking.

2. Description of the Prior Art

Various prior passive and radiometric millimeter wave length ground target detection and tracking systems have demonstrated highly accurate passive target tracking. However, these passive guidance systems tend to have relatively short range and, especially at the higher microwave frequencies, and further degraded by adverse atmospheric conditions. Accordingly, recent ground target seekers have relied more heavily upon the use of both active radar and passive radiometric modes to achieve beneficial combinations of target acquisition range and tracking accuracy. Operation in the active mode desirably affords the needed target acquisition and tracking range characteristics, while the relatively short range passive operation increases final tracking accuracy, overcoming the effects of target glint and scintillation at relatively short ranges.

Operation of active tracker systems in the 30 to 300 GHz frequency range results in a more desirable combination of antenna aperture size and weather penetration capability than does operation in higher or lower regions of the spectrum. In addition, significantly wider radio frequency band width is available for clutter smoothing and precipitation backscatter decorrelation than in the lower radar carrier frequencies. Typically selected millimeter wave operational frequencies are at 35 GHz and 95 GHz, where partial atmospheric windows are found; that is, where attenuation is much lower than in other parts of the millimeter wave spectrum. Since the primary use of the seeker is to detect and to track ground targets, its antenna receives a considerable amount of energy from the terrain in addition to that it receives from the target. In the active case, it is the reflected illuminating energy. In the passive case, it is primarily terrain emitted energy. In passive operation, the more reflective and therefore less emissive metallic targets tend to reflect the cold outer space temperatures and thus appear cold as contrasted with the warmer background. In the active mode, metallic targets appear as a higher source of reflected energy than a terrain area of equal physical size. In both cases, the seeker may logically be considered to be a contrast seeker. It is highly desirable to keep the antenna beam intercept on the terrain as small as possible. Since the seeker will normally be employed in relatively small diameter airframes or vehicles, it is desirable to employ carrier frequencies as high as possible, but they must be commensurate with the required atmospheric penetration capability.

Both pulse and frequency modulated carrier wave active mode waveforms have been employed in millimeter wave contrast seekers. These have employed relatively low power, solid state transmitter devices, taking into account cost of small terminally guided vehicles and volume and power constraints. Impatt diode oscillators are employed primarily in transmitter devices employing pulse modulated waveforms. The seeker of the present invention employs a frequency modulated waveform and a Gunn diode oscillator transmitter. It has significantly unique features over the system of the U.S. Pat. No. 3,921,169 for a "Multiple Mode Radiometric System with Range Detection Capability", issued in the names of R. E. Lazarchik, R. S. Roeder, and Donald R. Runkle, Nov. 18, 1975 and assigned to Sperry Corporation. The present invention is also generally related to that of U.S. Pat. No. 4,200,871 for an "Acquisition System for Continuous-Wave Frequency Modulation Object Detector", filed in the names of R. S. Roeder and L. C. Bomar and also assigned to Sperry Corporation.

Another important function of ground target contrast seekers is signal processing to discriminate against the active mode terrain reflected clutter energy which competes with the substantially point target reflected energy. Both pulse and frequency modulation continuous wave systems can employ range resolution to reduce the active mode clutter return by effectively reducing the illuminated terrain area which would otherwise result at the antenna beam intercept. Pulse systems employ narrow pulses and time gating to achieve range resolution. These systems in general must employ wide receiver intermediate frequency band widths in order to receive the narrow pulse. Band width of at least $1/\tau$ is required, where $\tau$ is the pulse duration in seconds. Systems employing incoherent frequency modulation wave forms can transmit energy over wide bands for effecting terrain and precipitation clutter decorrelation and still employ narrow receiver intermediate frequency band widths. This is an advantage in maximizing signal to total noise ratio ($S/N_t$). The active mode target detection range of millimeter wave contrast seekers is usually limited by the target signal to background noise ($S/N_B$); i.e., by the terrain reflected energy, thus indicating the desirability of minimizing antenna beam width. However, in certain environmental conditions, i.e., low terrain reflectivity and adverse atmospheric conditions, $S/N_r$ can become a range performance limiting factor. The quantity $S/N_r$ is defined as the signal to receiver noise ratio. This is particularly true if relatively long detection range is desired in a system operating at the higher millimeter wave frequencies, where higher atmospheric attenuation occurs. Thus, maximizing $S/N_r$ can be an important design factor. Range resolution in frequency modulation systems, employed for minimizing terrain and precipitation noise and for range to target/terrain measurement, is accomplished with frequency gating rather than time gating. Millimeter wave contrast seekers employing both horizontal trajectories and near vertical trajectories during target search have been demonstrated. Horizontal trajectory systems can better utilize range resolution to reduce background clutter during target search because of the antenna beam depression angle $\psi$ generally employed (in the order of 25 to 30 degrees from horizontal). The range resolution (range bin) intercept length on the terrain is increased over the actual range resolution by a factor of $(1/\cos \psi)$. It will be noted that, for a completely vertical system where $\psi = 90°$, the terrain clutter reduction that can be realized from range resolution is zero. Other typical differences between millimeter wave contrast seekers for horizontal and near vertical target search mode trajectories include the search pattern employed and the related target detection signal processing implementation.

Stabilization of the seeker system is the means by which the seeker line of sight (LOS) is decoupled from and made independent of vehicle body rotation. Two methods of the prior art will be briefly described. There generally are two control axes, but only elevation is shown in the figures. In the prior art system of FIG. 1, there are two rate gyroscopes disposed on antenna 1 on mutually orthogonal axes, one for elevation motion sensing and the other for azimuth motion sensing. Any vehicle motion-induced disturbance torque, such as from bearing friction, will tend to rotate antenna 1. The rate gyroscopes immediately sense this and send an opposing signal to amplifiers and thus to the torque motors which offset the disturbance torques and hold the antenna rate very nearly to zero. There is an additional amplifier input from the millimeter wave sensor which commands antenna 1 to track the target. When the tracking error $\epsilon$ is zero, the rate command is zero. In FIG. 1, and more particularly with respect to the elevation control channel, any motion-induced torque tends to rotate antenna 1 about the elevation axis 9. The elevation rate gyroscope 4 senses the rotation and supplies an opposing signal to servo amplifier 3 via lead 6 and thus to the elevation torque motor 2, which thereby holds the antenna rate substantially at zero. The input from terminal 5 from the millimeter wave sensor commands the antenna to track the target. The azimuth axis error correction is similar.

In the prior art two-degree-of-freedom gyroscopically stabilized system of FIG. 2, a spinning mass 7 is used directly to stabilize antenna 1. Any disturbance torques are automatically resisted by the spin momentum of the spinning mass 7. Slight precession errors are detected by the millimeter wave sensor and cross axis torques are automatically applied. For example, if an elevation error is apparent, azimuth torquer 8 is energized through servo amplifier 3 to precess antenna 1 about its elevation error to zero. Azimuth error correction is similarly accomplished.

SUMMARY OF THE INVENTION

The present invention is an active frequency modulation continuous wave target seeker system with vehicle body-fixed rate sensor stabilization. The seeker system functions in the active frequency modulation continuous wave radar mode using multiple range bins for target detection and tracking. The seeker system provides line of sight rate steering signals to the vehicle airframe to effect proportional navigation. In a preferred configuration the invention includes a microwave transmitter producing a swept frequency modulated carrier wave and also providing local oscillator signals. A transmitter feed and four surrounding receiver feeds cooperate with an antenna employing polarizing elements. After signal mixing, the gain controlled received signals are processed by a surface acoustic wave filter producing narrow frequency channels serving as range bins. A multiplexer scanning the multi-channel filter output controls a target acquisition detector, which initiates target angle tracking. It also controls a differential amplifier for terrain or background plus target range tracking. A range search generator is provided for repetitively moving a range bin or gate from greater to less than the range from seeker to terrain until range lock-on is instituted by a range lock-on threshold detector.

The stabilization system is constructed about a dual axis servo system driving a set of cooperating gimbals supporting the polarization twist plate antenna aperture. Elevation and azimuth tachometer rate sensors and position sensors, both driven directly by gimbal servo torque motors are provided, along with a pair of body-mounted dual axis rate sensors providing vehicle body pitch, yaw and roll rates. Also included in the system is a gimbal servo angle search command generator for acquisition of the target. Azimuth and elevation angle track demodulators determine line of sight to the target, error, and command line of sight rates of the gimbals during target tracking and output line of sight proportional signals to the vehicle automatic pilot.

BRIEF DESCRIPTION OF THE DRAWINGS

FIGS. 6 and 7 are respective elevation and azimuth views, partly in cross-sections, of features of the antenna mount.

FIGS. 8 and 9 illustrate details of the antenna feed.

DESCRIPTION OF THE PREFERRED EMBODIMENTS

Figure 1:
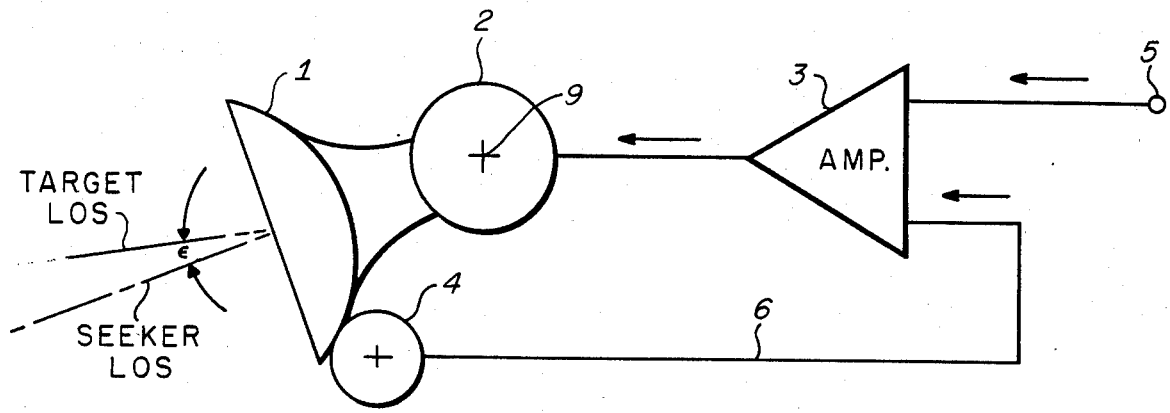
FIGS. 1 and 2 are elevation views of typical prior art target seeker antenna stabilization systems.
Figure 2:
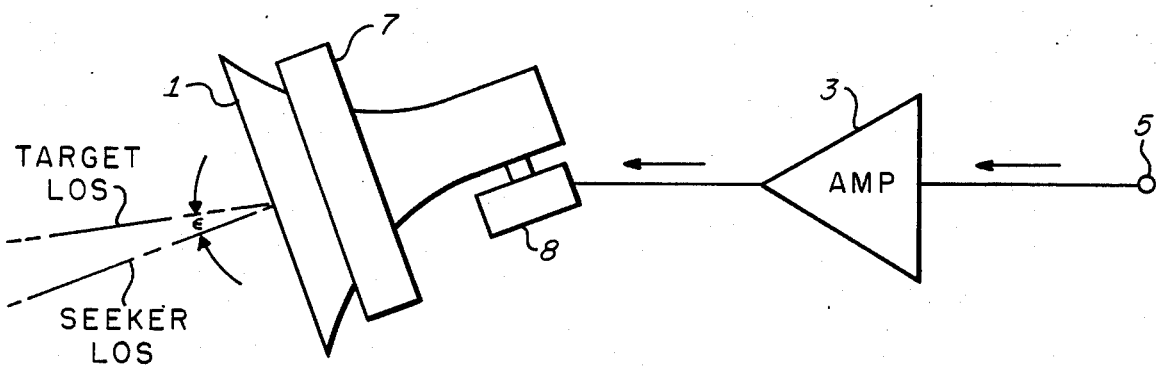
Figure 3:
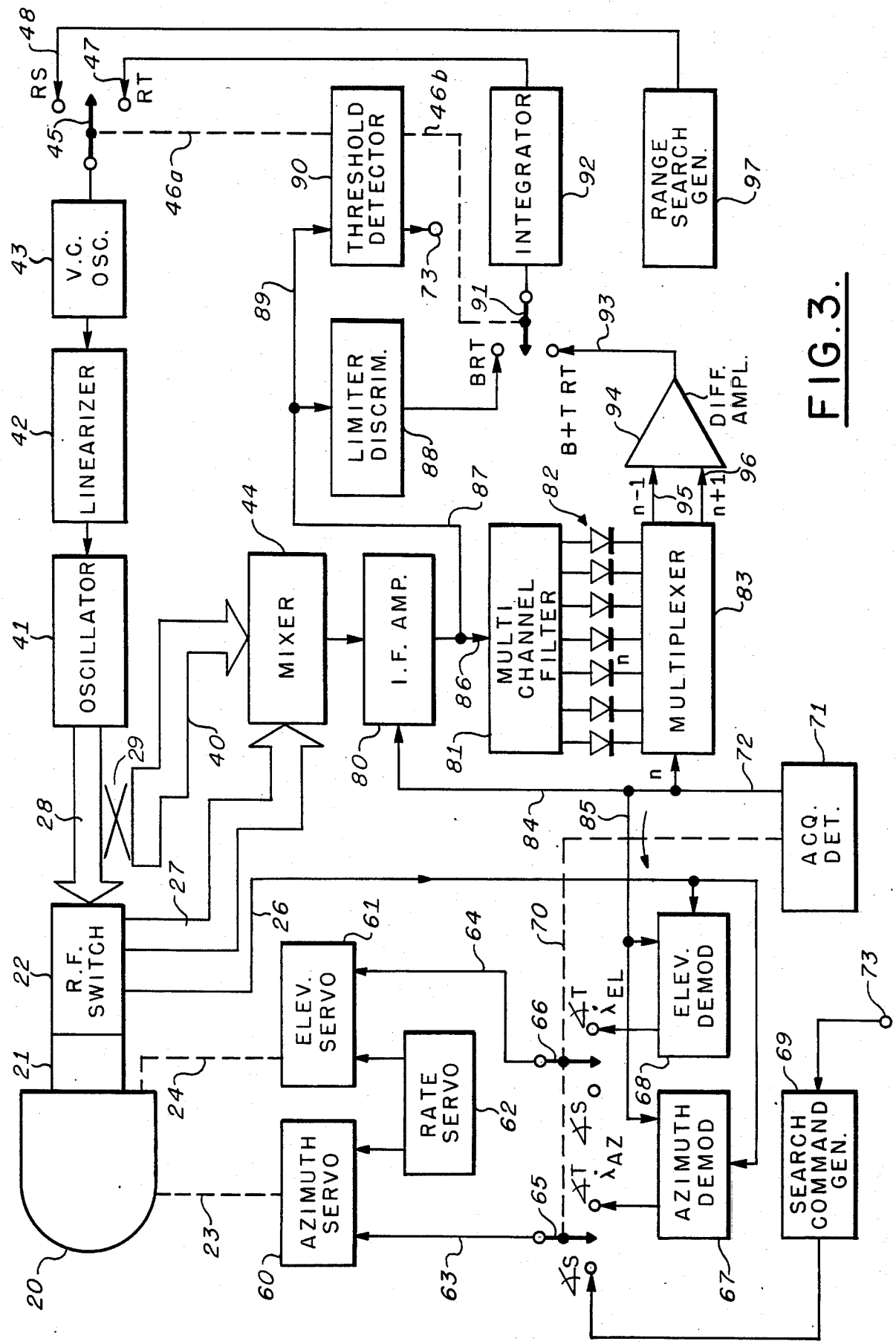
FIG. 3 is a diagram of the millimeter target sensor system, showing its electrical components and their interconnections.

Referring to FIG. 3, which represents the millimeter wavelength target sensor portion of the invention, millimeter wavelength transmitter and local oscillator signals are generated by the microwave oscillator 41, which may be a conventional Gunn diode oscillator, for example. The output of oscillator 41 is coupled through waveguide 28 to a conventional centrally located feed 21 for antenna 20 (see also the feed system 252 of FIG. 9). Antenna 20 may take any of several conventional forms, including a preferred form yet to be discussed; but it includes a matrix 244 (FIG. 9) of receiver feeds which may be made receptive in conventional cyclic or monopulse receiver fashions. Any received echo signals are coupled by the r.f. switch 22 via waveguide 27 to a conventional wide band microwave mixer 44, along with a cooperating local oscillator signal coupled from oscillator 41 through directional coupler 29 and waveguide 40. It is to be observed that oscillator 41, and, consequently, the transmitted and local oscillator outputs are continuous wave, frequency modulated signals. A linear sweep signal for oscillator 41 may be supplied by voltage controlled oscillator 43 and a conventional linearizing circuit 42, if required. Oscillator 43 is controlled by incoming signals selected by switch 45 from those appearing on leads 47 and 48, as will be explained.

It will be understood by those skilled in the art that the invention as described herein may be utilized over a broad range of frequencies. Operation from 30 GHz to 100 GHz in the millimeter wavelength frequency range is, however, particularly beneficial.

Mixer 44 feeds a relatively narrow band intermediate frequency amplifier 80 supplied with a gain control signal, as will be explained, via lead 84 from multiplexer 83. The output of i.f. amplifier 80 takes respective branching paths 86, 87, and 89 to a multi-channel filter 81, to a limiter-discriminator 88, and to a threshold detector 90, as will be explained.

Multi-channel filter 81 receives the i.f. output on lead 86; filter 81 may consist of n conventional parallel surface acoustic wave filters for passing side-by-side, contiguous, narrow frequency bands of signals representing a plurality of narrow frequency bands or range bins. The n outputs of filter 81 respectively pass through members of an array 82 of a corresponding plurality of diodes, poled as in the drawing, to n inputs of multiplexer 83, which latter provides means for scanning the plural outputs. The multi-channel narrow band filter 81 produces narrow range bins such that high range resolution, typically 0.5 percent to 2 percent of slant range, is achieved. This is employed to reduce the terrain clutter which competes with the target signal. The antenna beam terrain intercept may, for example, be divided into 16 areas, narrow in the range direction, by the use of 16 range bins.

Multiplexer 83 provides particular respective branching outputs on leads 84, 85 and 72. The output on lead 84 is the aforementioned gain control signal for use by i.f. amplifier 80, while the error signal components on lead 85 are supplied to first inputs of azimuth and elevation servo demodulators 67 and 68. Lead 72 supplies the same output to target acquisition detector 71, which latter initiates automatic target angle tracking through the operation of link 70 and consequent motion of the switches 65 and 66 to the right in the FIG. 3 drawing. For supplying an angle tracking phase reference signal within demodulators 67, 68, conventional quadrature reference signals are available within r.f. switch 22 because of a self-contained reference generator therein; the reference signals are passed via lead 26 to demodulators 67,68 wherein they are employed along with signals on lead 85 to generate azimuth and elevation error signals for respective supply via leads 63, 64 to the azimuth and elevation servos 60 and 61. Rate sensors yet to be discussed and indicated by the single package 62 supply stabilizing signals to servos 60, 61. When a target is acquired, the line of sight of antenna 20 is controlled in azimuth and elevation by servomotors 60 and 61 and the respective linkages 23 and 24, as will be further discussed. When no acquisition detection signal is present at detector 71, switches 65, 66 move to the left in the drawing so that there is no input to elevation servo 61. On the other hand, switch 65 couples the input of azimuth servo 60 to a search command generator 69 for azimuth search scanning purposes.

As previously noted, a branching output of i.f. amplifier 80 on lead 87 is supplied via lead 87 to limiter-discriminator 88 and via lead 89 to threshold detector 90. Lack of a signal detected by threshold detector 90 provides no output at terminal 73 of detector 90 and thus supplies none at the same terminal 73 as an input to search command generator 69. In this circumstance search command generator 69 does not produce a triangular wave output on lead 63 since azimuth scan is not desired until terrain range lockon occurs.

Threshold detector 90 serves as a range lock-on detector and also controls an internal actuator for moving links 46a, 46b up or down in FIG. 3. In this manner, either the output on lead 48 of range search generator 97 or of integrator 92 on lead 47 may be supplied to the respective RS or RT terminals of relay switch 45. Range search generator 97 produces a sawtooth wave for repetitively moving a range bin or gate from greater to less than the range from seeker to terrain until range lock-on occurs.

The range search function employs the full active i.f. bandwidth output (effectively a wide bin) for initially locking onto terrain, thus utilizing much more terrain reflected energy than would be available from one of the narrow range bin filters of the multichannel filter. It will be recognized that in a swept frequency modulation continuous wave active radar system, range to terrain or terrain plus target must be measured in order to keep the active i.f. center (beat) frequency essentially constant and centered within the i.f.band. Detection can occur in any of the range bins (e.g. bin n in FIG. 3). The multiplexer 83 scans the range bin filters 81 and the acquisition detector 71 selects the bin with the target. This detector 71 can be a simple threshold level detector or it may be a target signal detector similar to that described in FIG. 3 of the U.S. Pat. No. 4,150,379 to Joseph L. Connors, issued Apr. 17, 1979 for a "Matched Filter Target Acquisition Radiometric System", and assigned to Sperry Corporation. In like manner, the selected $(n-1)$ and $(n+1)$ signals from multiplexer 83 may be supplied via leads 95, 96 to amplifier 94 to provide a differential output over lead 93 to one terminal of relay switch 91. Range tracking after target detection is accomplished by comparing energy in alternate $(n-1)$ and $(n+1)$ range bins, e.g., bins 3 and 5 if the target is in bin 4. The proper bins for range tracking, i.e., on each side of the target bin, are automatically selected by multiplexer 83 at the time of target detection. According to the position of link 46b, the output of differential amplifier 94 may be coupled to integrator 92 or, alternatively, the output of limiter-discriminator 88 may be coupled to integrator 92.

Figure 4:
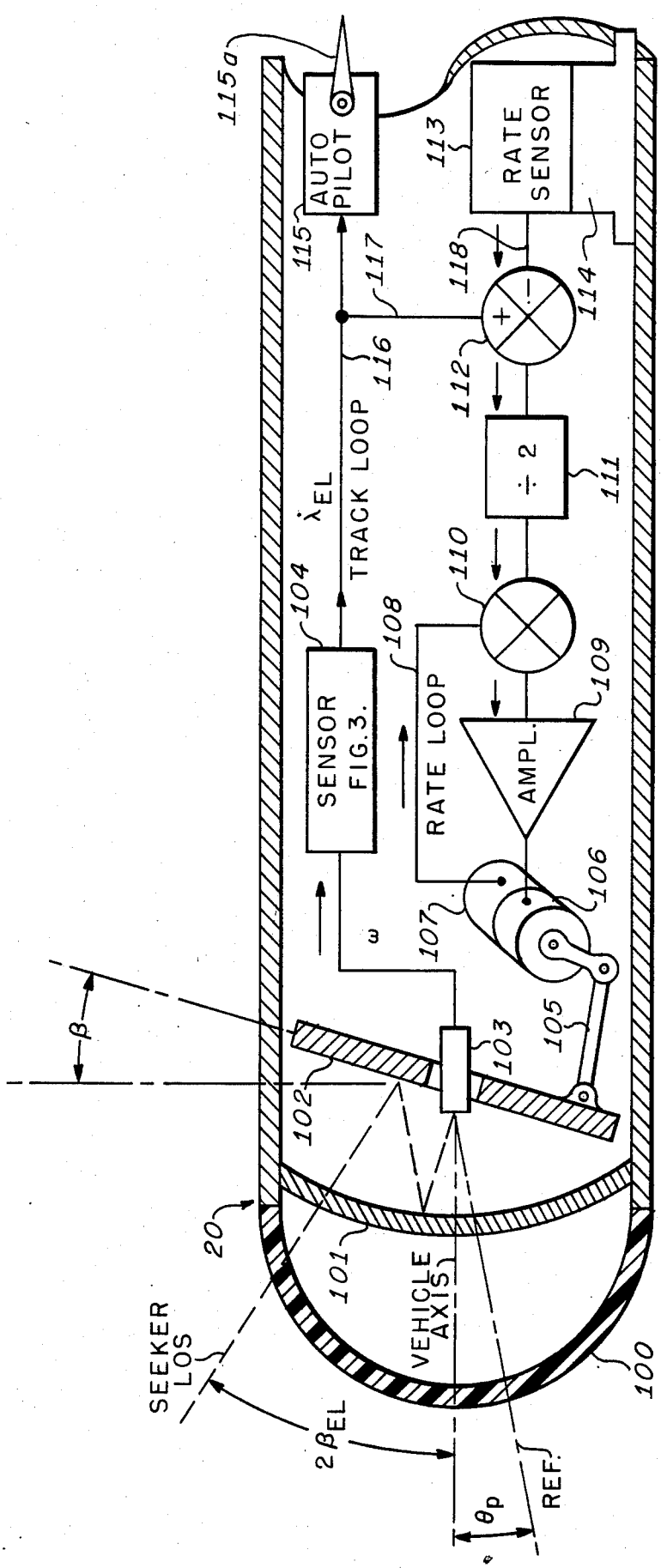
FIG. 4 is an elevation view, partly in cross-section, of the novel antenna and stabilization system.

Referring now to FIG. 4, the operation of antenna 20 of FIG. 3 will be described in a discussion limited to the elevation axis of the system. It will be apparent that the actual system employs scanning and stabilization about two mutually perpendicular axes. The dual mode rapid scan, rapid track antenna is beneficially a very low inertia device, eliminating excessive antenna driving forces. In FIG. 4, the feed system 103 is centered generally at the axis of the vehicle, and is arranged to illuminate a fixed symmetrically disposed parabolic reflector 101. Reflector 101 is a conventional polarization sensitive shaped sheet and reflects or transmits energy incident upon it depending upon the plane of polarization of the millimeter energy incident upon it. The primary feed horn 252 (FIG. 9) of antenna feed 103 (or 244) is polarized so that parabolic member 101 reflects and focusses the spherical wave incident upon it into a flat phase front. The collimated transmitter beam thus formed is directed against the scanning mirror 102. It is adapted in a conventional manner to rotate the plane of polarization of the flat phase front through 90 degrees and reflects the electromagnetic beam back toward the parabolic reflector in a new direction determined by the angular position of mirror 102. Because the reflected radiation pattern is polarized orthogonally to the polarization of the initial feed horn 252, it passes with little loss directly through that polarization discriminating parabolic focussing member 101. Reflector 101 may serve as a radome for the apparatus, or a separate radome 100 may be used.

Details of the microwave structure used in constructing the antenna reflector 101, 102 do not necessarily form a novel part of the present invention, since there is a variety of readily available approaches to the problem. Leon Schwartzman and Robert W. Martin describe one useful arrangement in the technical paper: "A Rapid Wide-Angle Scanning Antenna with Minimum Beam Distortion", published in the Proceedings of the Fifth Annual East Coast Conference on Aeronautical and Navigational Electronics, October 1958.

Martin and Schwartzman employed a parabolic focussing member 101 consisting of an aluminum honeycomb sandwich structure to which a flat metal strip grating was bonded. The grid size and spacing and the sandwich dimensions were balanced to insure reflection for one polarization and high transmission for the orthogonal polarization.

In the present invention, the parabolic focussing member 101 comprises the above-described flat metal strip grating bonded to a cross-linked styrene copolymer substrate commonly used as a microwave dielectric material such as that manufactured under the trade name "Rexolite" and distributed by the Oak Materials Group, Inc., Franklin, N.H. 03235. The scanning mirror 102 has a two-fold function: first, it introduces a linear phase shift upon the flat phase front. The consequent pattern is therefore the secondary pattern of a constant-phase aperture field rotated through an angle equal to twice the angular displacement of scanning mirror 102. Secondly, scanning mirror 102 rotates the polarization of the energy incident upon it through 90 degrees. Scanning mirror 102 employs a grating member identical to that present in paraboloid 101, which may be a layer of low dielectric such as isocyanate foam above a metallic ground plane, having an orientation of the longitudinal dimension of 45 degrees with respect to the incident polarization. In the present invention a glass microfiber reinforced PTF material commonly used for strip line and microstrip circuit applications such as that manufactured under the name "Duroid" and distributed by the Rogers Corporation, Micromet Division, Box 700, Chandler, Ariz. 85224, may be used in lieu of isocyanate foam.

It will be appreciated by those skilled in the art that the antenna 20 is a desirable low inertia, low power consuming, compact device allowing maximum aperture and minimizing the antenna beam intercept at the terrain level. The illuminated background clutter in the active mode is minimized, as well as the background radiated power at the receiver input in the passive mode. Since the antenna pattern is steered by an angle twice the angular motion of the twist plate mirror 102, the total field of view of antenna 20 in both planes is maximized. Since the antenna feeds 244 are fixed, a conical scan motor is eliminated, as well as complex rotating microwave joints.

As further seen in the simplified single axis system of FIG. 4, and in the tracking mode, the receiver horns 251 and 254 as shown in FIG. 9 supply elevation error data ω for sensor processing by the target sensor system 104 shown in detail in FIG. 3, thus generating line of sight rate data on lead 116 for use by the elevation axis of the vehicle flight control system or automatic pilot 115 for operation of elevation control surface 115a. This signal is also coupled via lead 117 to one input of summation device 112, poled as shown. Body rate signals generated by body rate device 113 are affixed by mounting 114 to the body of the vehicle and are coupled to a second input of summation device 112. The tracking loop is completed through summation device 112, analog amplitude divide-by-two circuit 111, a second summation device 110, servo amplifier 109, and torque motor 106 for driving link 105 and moving the scanner reflector 102 about its elevation axis. A rate stabilizing loop is provided in a path from the tachometer 107 driven by torque motor 106 through lead 108, the second summation device 110, amplifier 109, and torque motor 106. It will be understood that an operative system will contain an azimuth control system analogous to the elevation control of FIG. 4 for operating a flight control surface about its azimuth axis. In a typical application of the terminal guidance seeker system, the seeker autopilot controls the flight of the vehicle in a horizontal trajectory during the target search in azimuth with the antenna depressed below the horizon by an angle of about 25 to 30 degrees. Prior to arriving at the target area, the seeker is activated and range search is initiated employing the wide bin full active i.f. bandwidth. Terrain lock-on occurs within the first one to three range search periods and range track is initiated; i.e., the range track switch 45 is switched from search to track. With the range search-track switch 45 in its track position, the input of voltage controlled oscillator 43 and the sweep repetition frequency of the f.m. oscillator 41 is controlled from the wide bin range track output, thus keeping the beat frequency centered in the active i.f. band. Following range track initiation, target angle search is initiated either automatically or by a timer signal. Target search is conducted by varying the antenna azimuth position back and forth at a fixed rate to accomplish a cyclic azimuth scan, covering swaths of the terrain. Search area coverage in the range direction results from the forward motion of the vehicle. Preset horizontal search width may be varied from a very few degrees, e.g., ±3 degrees, to the full azimuth gimbal limit capability, e.g., ±20 degrees, as desired, and dependent on the limit imposed by the forward velocity of the vehicle.

A point target, detected in one of the narrow range bin channels by acquisition detector 71 will transfer the seeker from angle search to track. The outputs of the angle track demodulators 67,68 then control the motion of the azimuth and elevation antenna aperture gimbals to accomplish target angle track. At the time of target angle track initiation, signals proportional to seeker-to-target elevation and azimuth line of sight rate are fed to the automatic pilot 115 for proportional navigation guidance. This type of navigation employs vehicle heading rate of change proportional to vehicle to target rotational rate and thus requires line of sight rate information from the seeker. Employing antenna beam sequential lobing (or monopulse), the angle track demodulators 67, 68 measure the position of the antenna lobe pattern center with respect to target position and derive elevation and azimuth error. The error signals are employed to drive the antenna gimbals at rates proportional to the errors and thus are, in effect, line of signt rate signals. The same rate signals with conditioning are fed to the vehicle automatic pilot.

Figure 10:
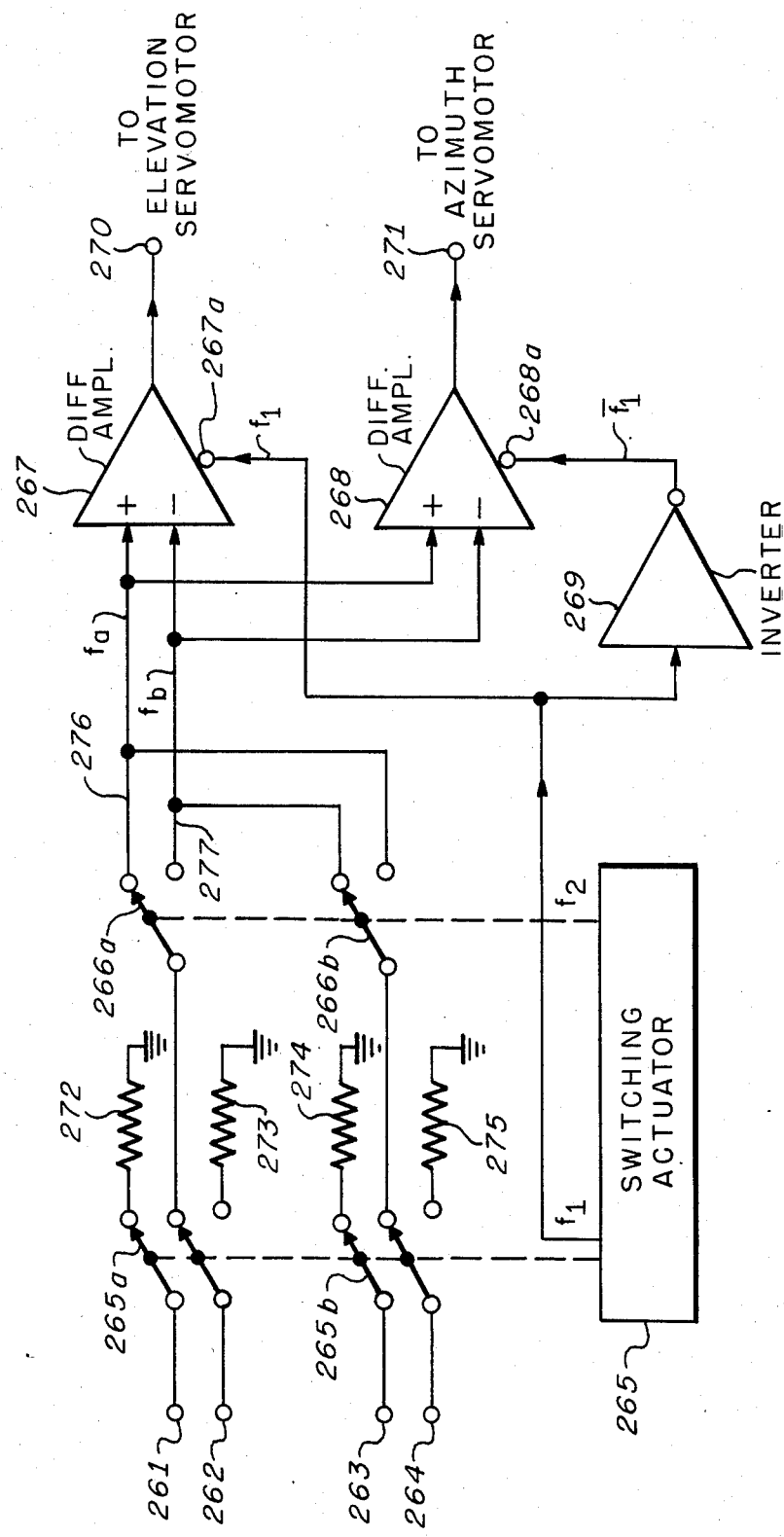
FIG. 10 is a diagram of the angle track demodulators showing their electrical components and their interconnections.
Figure 13:
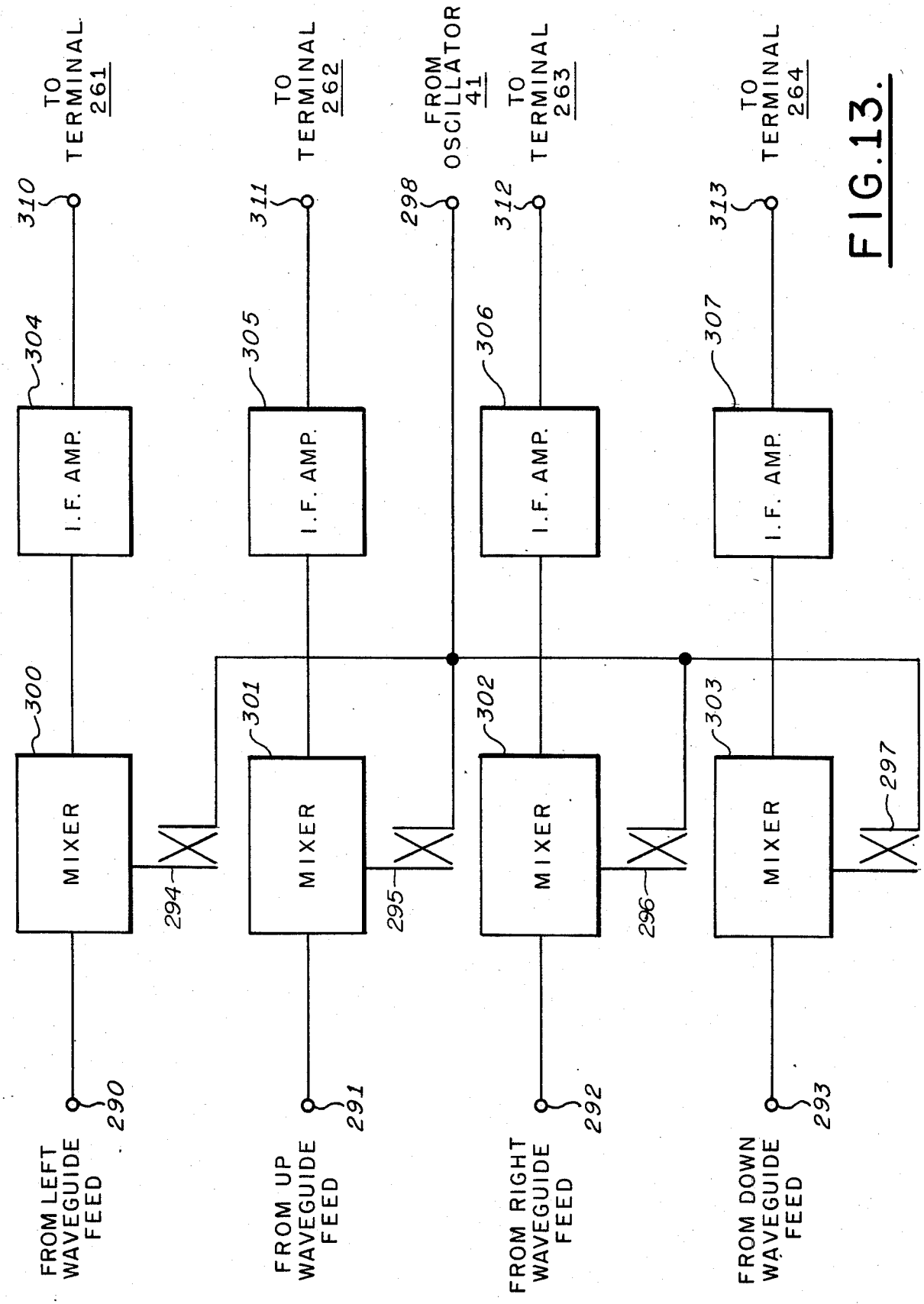
FIG. 13 is a block diagram of the r.f. and i.f. receiver section of the invention.

Left (L) 250, Up(U) 251, Right (R) 253 and Down (D) 254 waveguide feeds (FIG. 9) may be sampled in Left-Right and Up-Down pairs by the i.f. switch of FIG. 10 via the i.f. circuitry of FIG. 13. Input terminals 261, 262, 263 and 264 are coupled to the terminals 312, 310, and 313 respectively and further coupled to input terminals of switches 265a and 265b, the middle output terminals of which are in turn coupled to input terminals of switches 266a and 266b, the remaining output terminals being coupled to resistors 272, 273, 274 and 275. The output terminals of switches 266a and 266b are coupled to input terminals of the differential amplifiers 267 and 268 poled as shown in FIG. 10. Switching actuator 265 actuates switches 265a, 265b, 266a and 266b and further supplies a switching signal $f_1$ to the gating terminal inputs 267a, and 268b of gated differential amplifiers 267 and 268, respectively. The output terminals 270 and 271 of differential amplifiers 267 and 268 are coupled to the elevation servomotor 60 and azimuth servomotor 61, respectively.

Figures 11, 12:
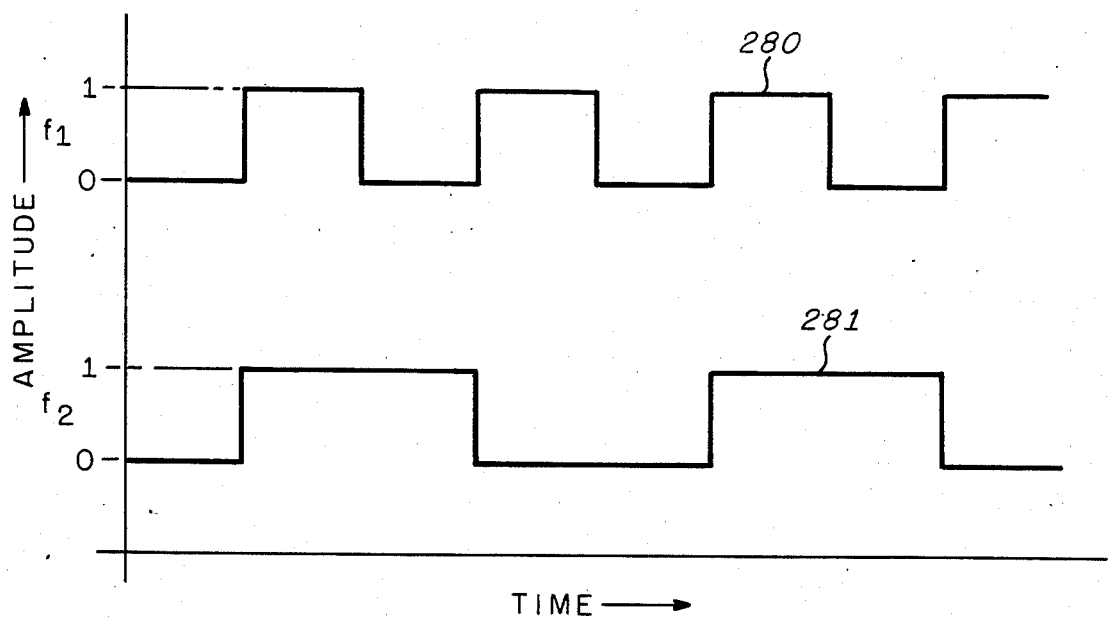
FIG. 11 is a logic table useful in explaining the operation of the invention.
FIG. 12 illustrates signal waveforms useful in explaining the operation of the apparatus of FIG. 10.

In operation, switching actuator 265, which may utilize logic gates and microprocessor control to generate switching signals $f_1$ and $f_2$ shown in FIG. 12 as waveforms 280 and 281, respectively, is arranged to actuate switches 265a, 265b, 266a and 266b in accordance with signals $f_1$ and $f_2$. The frequency of signal $f_1$ is twice that of $f_2$ and phased as shown in FIG. 12. Referring again to FIG. 10, switches 265a, 265b, and 266a and 266b will be positioned to contact the upper terminals, when siganls $f_1$ and $f_2$ have a value of zero, and will be in the lower position when $f_1$ and $f_2$ have a value of one. Thus, the switch output signals $f_a$ and $f_b$ are governed by the logic table of FIG. 11, such that output signals $f_a$ and $f_b$, appear on leads 276 and 277, and comprise signals corresponding to Up-Down and Right-Left signal pairs. The signal pairs are coupled to gated differential amplifiers 267 and 268 which supply a signal at their output terminals equal to the difference of $f_a$ and $f_b$ or $f_a - f_b$. The differential amplifiers 267 and 268 are turned on and off by gating signal $f_1$, so that Up-Down difference signals are supplied at output terminal 270, and Right-Left difference signals are supplied at output terminal 271. Inverter 269, inverts the signal $f_1$, and thus the differential amplifiers 267 and 268 are alternately gated on and off.

The Up-Down difference signals present at output terminal 270, are amplified in intermediate frequency amplifiers, are processed by elevation angle track demodulator circuits, and are coupled to elevation servomotor 61. The Right-Left difference signals available at output terminal 271, are amplified in intermediate frequency amplifiers, are processed by azimuth angle track demodulator circuits, and are coupled to azimuth servomotor 60.

Alternatively, the Up-Down, Right-Left antenna output signals may be sampled at the antenna feeds rather than i.f. frequencies; such a configuration is shown in FIG. 13. Input terminals 290, 291, 292 and 293 are coupled to waveguide feeds 250, 251, 253, and 254 and further coupled to mixers 300, 301, 302 and 303, respectively. The r.f. oscillator signal from oscillator 41 is coupled via input terminal 298 and directional couplers 294, 295, 296 and 297, respectively. I.F. amplifiers 304, 305, 306 and 307 are coupled at their input terminals to receive the output signal of mixers 300, 301, 302 and 303, respectively, and to provide i.f. signals to output terminals 310, 311, 312 and 313, respectively, which may be coupled to input terminals 261, 262, 263 and 264, respectively.

In operation, individual r.f. signals received from waveguide feeds 250, 251, 253, and 254 are beat against signals received from oscillator 41, in the corresponding mixers 300, 301, 302 and 303, the beat frequency signal $f_b$ being amplified in the i.f. amplifiers 304, 305, 306 and 307, respectively, thus forming a four-channel receiver. The i.f. signals from the four-channel receiver are coupled to input terminals 261, 262, 263, and 264 to enable sampling of intermediate frequency signals corresponding to the radio frequency signals. The demodulator of FIG. 10 provides error correction signals to the azimuth and elevation servomotors. At the time of target detection, range track switch 45 is automatically switched to background plus target position data and more accurate narrow bin, e.g., (n−1), (n+1) comparison range tracking commences. Following angle track initiation, target track and vehicle terminal guidance continue, resulting in a direct hit on the target. If the seeker implementation includes a passive or radiometric mode and environmental conditions are favorable, the seeker may be automatically switched to its passive mode at a relatively short range, e.g., 300 m., for improved terminal accuracy and for a hit very close to the target physical centroid.

Referring again to FIG. 4, the basic method of stabilizing the seeker line of sight is shown. In the system, the antenna 102 uses the torque servomotor 106 and rate sensor 107 acting together, the rate sensor 107 being a tachometer which senses antenna rate relative to the vehicle body. Also to cancel vehicle motion disturbance at antenna 102, the body fixed rate sensor 113 measures this motion and drives antenna 20 or 102 in the opposite direction to keep it pointing in a fixed direction. The rate command from millimeter wave sensor 104 drives antenna 20 or 102 to track the target. As noted in FIG. 4, twist reflector antenna 102 acts like a mirror and thus, the seeker line of sight does not correspond to the reflector plate center line. The plate angle in space is exactly one-half the seeker angle line of sight in space. The plate rate $\dot{\beta}$ is controlled such that $\dot{\beta} = \frac{1}{2}\dot{\theta}_p$, where $\dot{\theta}_p$ is the vehicle pitch rate.

Because of the significance of the unique antenna control, stabilization and body motion decoupling subsystem in the seeker, features of this sub-system will be discussed in further detail with respect to FIGS. 4, 5, 6 and 7. As noted earlier, twist reflector 102 has significant advantages from packaging and drive power standpoints. Because only a thin plate is moved to direct the seeker line of sight and because the reflector plate has a two-to-one gain, it is easy to obtain usable seeker line of sight angles of ±° or more with an aperture diameter that is 90 percent or more of the vehicle diameter. The low moment of inertia of the plate 102 minimizes electrical power required to accelerate line of sight. This low power minimizes the radio frequency interference and torque servomotor heating problems commonly experienced with other torque motor drives. Because the twist reflector performs like a mirror with a gain of two, the seeker line of sight is inherently coupled to vehicle motion. This coupling is removed with the control implementation shown in FIG. 5. Tracking stabilization and search stabilization will be described.

As noted in FIGS. 6 and 7, reflector 102 includes a central aperture 245 accommodating waveguide feed system 244 shown in FIGS. 8 and 9 and is journalled for horizontal motion in journals 232 and 247 diametrically fixed upon inner gimbal 231. Gimbal 231 is, in turn, provided with opposed journals 223, 236 vertical motion of apertured (246) gimbal 231 and therefore plate 102. Journals 223, 236 are supported in yoke 230, 235 affixed to the vehicle body 234. A vehicle body-fixed azimuth torque servmotor 210 drives pick-off accessories attached thereto and also drives linkage 239, 238, 237 for positioning reflector plate 102 in azimuth. Similarly, reflector plate 102 is positioned in elevation by torque motor 150 and linkage 249, 233, 248. The described motions occur with respect to the body-fixed antenna feed system 244.

Figure 5:
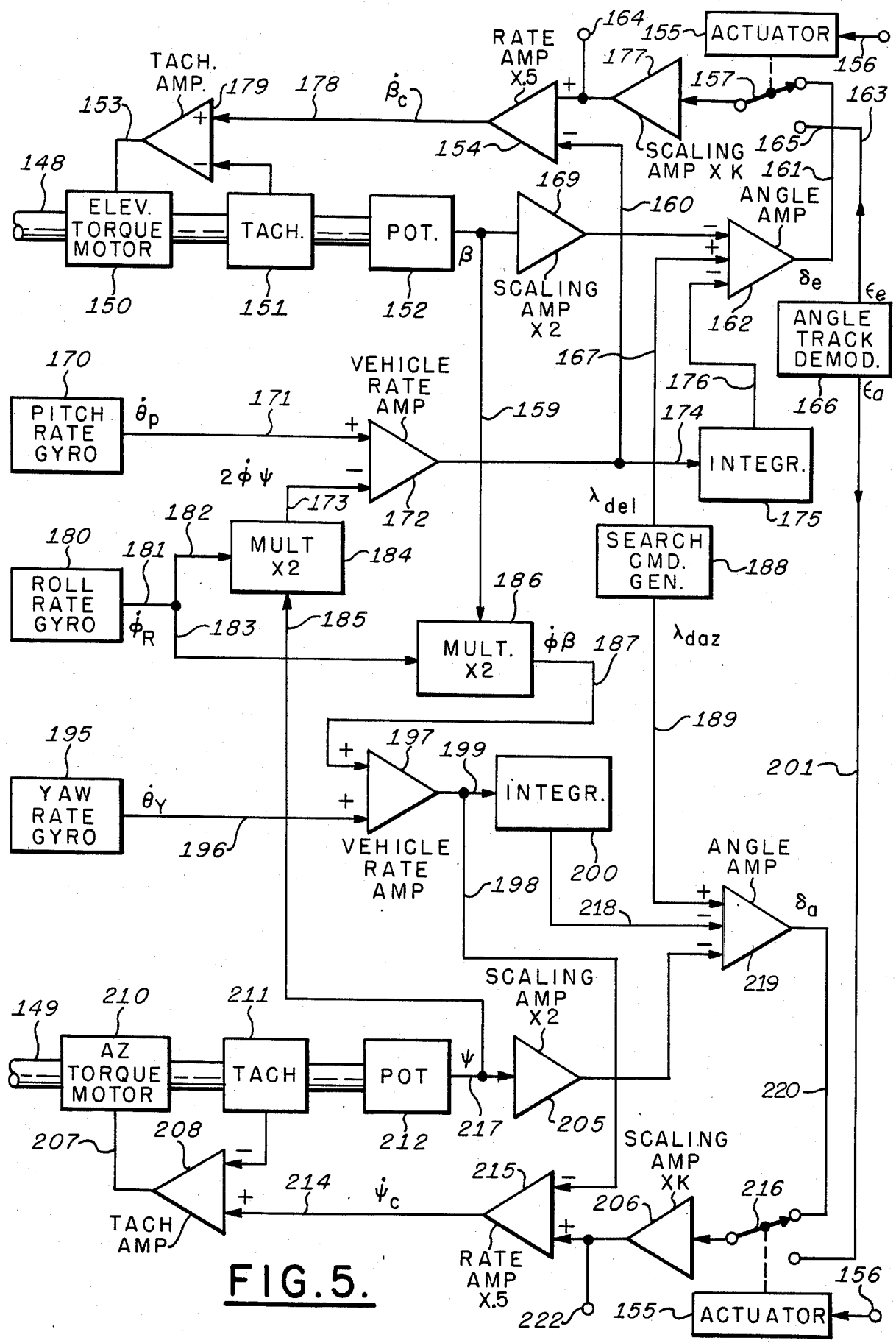
FIG. 5 is a detailed diagram, showing components and their electrical connections, of the stabilization system.

Turning now to FIG. 5, it will be seen that the rotor of elevation torque servomotor 150 is coupled by the same shaft 148 to operate a tachometer 151 and elevation position pick-off potentiometer 152. Likewise, the rotor of azimuth servo torque motor 210 is coupled by the same shaft 149 to tachometer 211 and to azimuth position pick-off potentiometer 212. Body-fixed pitch, roll, and yaw rate gyroscopes 170, 180, 195 supply further stabilization signals.

The rate summing amplifier 154 supplies its output via lead 178 to tachometer summing amlp 179. The input terminals of rate summing amplifier 154, poled as shown in FIG. 5, include a signal on lead 160 coming indirectly from pitch rate gyroscope 170 coupled via lead 171 to one input of body rate summing amplifier 172, poled as shown, and a signal on lead 173 from a conventional analog-multiplier 184. A second input terminal for amplifier 154 is selectively derived via scaling amplifier 177 from the two taps of switch 157, shown for convenience as a relay actuated by ctuator 155 duplicated at the top and bottom of FIG. 5 though actually unitary. Rate summing amplifier 154 has an over-all gain of 0.5. The selectable signals are the output signals $\delta_e$ on lead 161 of angle summing amplifier 162 or the elevation error output signal $\epsilon_e$ of angle track demodulator 166 on leads 163, 165. The inputs of tachometer summing amplifier 179, poled as shown, include the output signal $\beta_c$ of rate amplifier 154; tachometer summing amplifier 179 supplies its output signal via lead 153 to drive elevation torque servomotor 150. The combination of the rate summing amplifier 154, elevation torque motor 150, tachometer 151, tachometer summing amplifier 179 and drive linkage 148 forms the elevation rate servo which is the heart of the elevation drive. The bandwidth of the srvo may be 60 Hz, for example. Scaling amplifier 177 multiplies signals received at its input terminal by a predetermined constant, K.

In an analogous manner in the azimuth tracking channel, the rate summing amplifier 215 supplies its output via lead 214 to tachometer summing amplifier 208. The inputs of rate summing amplifier 215, poled as shown, include a signal on lead 198 coming indirectly from yaw rate gyroscope 195 coupled via lead 196 to one input of body rate summing amplifier 197, poled as shown, and a signal on lead 187 from analog multiplier 186. A second amplifier 215 input is selectively derived via scaling amplifier 206, from the two taps of switch 216 shown at the bottom of the drawing as also actuated by actuator 155. Rate summing amplifier 215 has a gain of 0.5. The selectable signals are the output signal $\delta_a$ on lead 220 of angle summing amplifier 219 or the azimuth error output signal $\epsilon_a$ of angle track demodulator 166 on lead 201. The inputs of tachometer summing amplifier 208, poled as shown, include the output signal $\psi_c$ of rate amplifier 215; tachometer summing amplifier 208 supplies its output signal via lead 207 to drive azimuth torque servomotor 210. The combination of the rate summing amplifier 215, azimuth torque motor 210, tachometer 211, tachometer summing amplifier 208, and drive linkage 149 form the essential parts of the azimuth rate servo in the azimuth drive. Scaling amplifier 206 multiplies signals received at its input terminal by a predetermined constant K.

Signals from roll rate gyroscope 180 on lead 181 are used in common in the two aforedescribed elevation and azimuth channels. These roll rate gyroscope signals are coupled in common via branching leads 182, 183 to the respective multipliers 184, 186, which additionally multiply the products of their input signals by a factor of 2. As noted, antenna azimuth position from azimuth potentiometer 212 is coupled by lead 185 as the second input to multiplier 184; elevation position from potentiometer 152 is coupled by lead 159 as a second input to multiplier 186.

The output of body rate summing amplifier 172, in addition to being supplied to rate summing amplifier 154 via lead 160, goes to integrator 175 via lead 174. The output of integrator 175 is, as noted, fed via lead 176 to one input of angle summing amplifier 162. In a similar manner, the output of body rate summing amplifier 197, in addition to being coupled into rate summing amplifier 215 via 198, goes to integrator 200 via lead 199. The output of integrator 200 is, as noted, fed via lead 218 to one input of angle summing amplifier 219. A third input terminal of angle amplifier 162, poled as shown, is coupled to receive the output signal $\beta$ of potentiometer 152 via scaling amplifier 169. Similarly, a third input terminal of angle amplifier 219, poled as shown, is coupled to receive the output signal $\psi$ of potentiometer 212 via scaling amplifier 205. Scaling amplifiers 169 and 205 function to multiply their respective input signals by a factor of 2. It will be understood by those skilled in the art that the angle track demodulators 166 of FIG. 5 are analogous to demodulators 67, 68 of FIG. 3; the elevation demodulator in block 166 supplies a measure of the elevation tracking error $\epsilon_e$ to the elevation error scaling amplifier 177, while the azimuth demodulator in block 166 feeds a measure of the azimuth tracking error $\epsilon_a$ to the azimuth error scaling amplifier 206.

Furthermore, a search command generator 188 is provided to generate command signals $\lambda_{del}$, $\lambda_{daz}$ for application via leads 167, 189 to respective inputs of angle summation amplifiers 162, 219. For initiating angle search, actuator 155 responds to an input on terminal 156 by placing the two switches 157, 216 in their upper positions. Actuator 155 is driven directly from acquisition detector 71 of FIG. 3. The elevation search error signal $\delta_e$ on lead 161 is now formed of the summation of the search command signal $\lambda_{del}$ on lead 167, the elevation reflector plate angle signal $2\beta$ output of scaling amplifier 169, and the integrated vehicle rate compensation signal received the output integrator 175. The closed servo loop acts to keep the search error signal $\delta_e$ generally small so that the output of potentiometer 152 is closely equal to one-half of the difference between the search command signal on lead 167 and the integrator output on lead 176. This implementation compensates for vehicle body motion so that the line of sight angle in space is closely proportional to the search command signal.

During automatic tracking, it is desirable for the antenna stabilization system to control the antenna reflector plate rate $\dot{\beta}$ according to the equation:

$$\dot{\beta} = \tfrac{1}{2}[(\dot{\lambda}_{SE} - \dot{\theta}_p) + 2\psi\dot{\theta}_R] \quad (1)$$

where:
  $\dot{\lambda}_{SE}$ = the actual seeker elevation line of sight rate,
  $\dot{\theta}_p$ = the vehicle pitch rate, $\psi$ = the reflector plate azimuth angle,
$\dot{\phi}_R$ = the vehicle roll rate.

These signals are indicated in FIG. 5.

The output signal $\dot{\beta}_c$ of rate amplifier 154, in the track mode will be $$\dot{\beta}_c = \tfrac{1}{2}(K\epsilon_e - \dot{\theta}_p + 2\psi\dot{\phi}_R) \tag{2}$$

where:
$\epsilon_e$ = angle track elevation error signal provided by angle track demodulator 166,
K = a constant provided by scaling amplifier 177.

The basic elevation line of sight control law for the seeker in search and track modes is:

$$\dot{\lambda}_{SE} = K(\lambda_{del} - \lambda_{SE}) \tag{3}$$

where:
$\lambda_{del}$ = the desired seeker line of sight in elevation,
$\lambda_{SE}$ = the actual seeker line of sight in elevation,
and for track mode:

$$\lambda_{del} - \lambda_{SE} = \epsilon_e \tag{4}$$

Thus, from equations (3) and (4)

$$\dot{\lambda}_{SE} = K\epsilon_e \tag{5}$$

This is the signal at terminal 164 in FIG. 5, and in the track mode is coupled to the pitch channel of the automatic pilot. From equations (2) and (5)

$$\dot{\beta}_c = \tfrac{1}{2}[(\dot{\lambda}_{SE} - \dot{\theta}_p) + 2\psi\dot{\phi}_R)] \tag{6}$$

The servo loop, comprising tachometer summing amplifier 179, elevation servomotor 150, and tachometer 151, operates so that the actual plate rate $\dot{\beta}$, approaches the plate rate command signal $\dot{\beta}_c$, such that:

$$\dot{\beta} \approx \dot{\beta}_c \tag{7}$$

and the results of equation (1) are substantially achieved.

In a similar manner the equation $$\dot{\psi} = \tfrac{1}{2}[(\dot{\lambda}_{SA} - \dot{\theta}_y) - \beta\dot{\phi}_R] \tag{8}$$

where:
$\dot{\psi}$ = the desired antenna reflector plate azimuth rate,
$\dot{\lambda}_{SA}$ = the actual seeker azimuth line of sight rate,
$\beta$ = the reflector plate elevation azimuth angle
is implemented to control the antenna reflector plate in azimuth.

The output signal $\dot{\psi}_c$ of rate amplifier 215 in the track mode will, in like manner of equation (2), be:

$$\dot{\psi}_c = \tfrac{1}{2}(K\epsilon_a - \dot{\theta}_y - 2\beta\dot{\phi}_R) \tag{9}$$

and analogous to equation (5)

$$\dot{\lambda}_{SA} = K\epsilon_a \tag{10}$$

which is the signal at terminal 222, and in the track mode is coupled to the yaw channel of the automatic pilot. Also in a manner similar to that described for elevation control, the azimuth servo loop operates so that the actual plate rate $\dot{\psi}$, approaches the plate rate command $\dot{\psi}_c$, such that $$\dot{\psi} \approx \dot{\psi}_c \tag{11}$$

and the result of equation (8) is substantially achieved.

During the search mode, the output signal $\dot{\beta}_c$ of rate amplifier 154 will be, analogous to equation (2)

$$\dot{\beta}_c = \tfrac{1}{2}(K\delta_e - \dot{\theta}_p + 2\psi\dot{\phi}_R) \tag{12}$$

where:
$\beta_e$ = the angular error signal in elevation, provided by angle amplifier 162.

For the search mode, $$\delta_e = \lambda_{del} - \lambda_{SE} \tag{13}$$

where $\lambda_{del}$ is obtained on lead 167, from the search command generator.

The actual seeker line of sight in elevation, $\lambda_{SE}$, is determined, and subtracted from $\lambda_{del}$, in angle amplifier 162, so that:

$$\delta_e = \lambda_{del} - 2\beta - \int(\dot{\phi}_p - 2\psi\dot{\phi}_R)dt \tag{14}$$

Multiplication of the error signal $\delta_e$, by k obtains the desired seeker line of sight rate in elevation such that $$K\delta_e = \dot{\lambda}_{SE} \tag{15}$$

and equation (3) is satisfied.

In like manner, for the azimuth control in search mode, equation (14) becomes:

$$\delta_a = \lambda_{daz} - 2\psi - \int(\dot{\phi}_y + 2\beta\dot{\phi}_R)dt \tag{16}$$

where $\delta_a$ is provided by angle amplifier 219 on lead 220, and $\lambda_{daz}$, is provided by search command generator 188 on lead 189. Equation (15) becomes $$K\delta_a = \dot{\lambda}_{SA} \tag{17}$$

and again equation (3) is satisfied.

Referring to FIGS. 6 and 7, it will be understood by those skilled in the art that the plate azimuth angle $\psi$ may not be equal to the azimuth motor angle $\psi_m$ and the plate elevation angle $\beta$ may not be equal to the elevation servomotor angle $\beta_m$. The relation therebetween is approximated by the following equation:

$$\beta = \frac{r_e}{R_e} \sin \beta_m \tag{18}$$

$$\psi = \frac{r_a}{R_a} \frac{\sin \psi_m}{\cos \beta} \tag{19}$$

where the distances $R_a$, $r_a$, $R_e$, $r_e$ are as shown in FIG. 6 and FIG. 7.

The rates of change of the plate angles $\dot{\beta}$ and $\dot{\psi}$ relative to the rate of change of the motor angles $\dot{\beta}_m$ and $\dot{\psi}_m$ can be found as follows:

$$\frac{\dot{\beta}}{\dot{\beta}_m} = \frac{\partial \beta}{\partial \beta_m} = \frac{r_e}{R_e} \cos \beta_m \tag{20}$$

$$\frac{\dot{\psi}}{\dot{\psi}_m} = \frac{\partial \psi}{\partial \psi_m} = \frac{r_a}{R_a} \frac{\cos \psi_m}{\cos \beta} \tag{21}$$

where
$(\dot{\beta}/\dot{\beta}_m)$ determines the azimuth linkage gain and
$(\dot{\psi}/\dot{\psi}_m)$ determines the elevation linkage gain.

Typical values for $(r_e/R_e)$ and $(r_a/R_a)$ are 0.25 to 0.35. The maximum seeker line of sight angle is generally 20 degrees, which requires plate angles, $\beta$ and $\psi$ of 10 degrees, and consequently motor angles $\beta_m$ and $\psi_m$ of approximately 40 degrees. Most operation, however, will occur at angles having less than half of these values. It is clear that for plate angles less than 5 degrees, the cosine $\beta$ term is close to unity and therefore has little significance. Motor angles $\beta_m$ and $\psi_m$ of 20 degrees are, however, significant. The cosine of 20 degrees is approximately 0.94, which would ordinarily result in 6% gain reduction with respect to the zero angle case. In the present invention this gain reduction is compensated for by using a tachometer in a feedback configuration, having a gain that is closely proportional to the cosine of the servomotor angle. Over a wide range of frequencies, the rate servomotor gain $\dot{\beta}_m/\dot{\beta}_c$ and $\dot{\psi}_m/\dot{\psi}_c$ are proportional to the reciprocal of the tachometer gain and can be expressed as:

$$\frac{\dot{\beta}_m}{\dot{\beta}_c} = \frac{1}{K_{Tach} \cos \beta_m} \quad (22)$$

$$\frac{\dot{\beta}_m}{\dot{\beta}_c} = \frac{1}{K_{Tach} \cos \psi_m} \quad (23)$$

where $\dot{\beta}_c$ = the total rate command $K_{Tach}$ = the tachometer gain constant.

Thus the antenna rates $\dot{\beta}$ and $\dot{\psi}$ with respect to the total rate command signal $\dot{\beta}_c$ and $\dot{\psi}_c$ appearing at the servomotor inputs and due to the body rate sensors and angle track demodulator signals can be found as follows:

$$\frac{\dot{\beta}}{\dot{\beta}_c} = \left(\frac{\dot{\beta}}{\dot{\beta}_m}\right)\left(\frac{\dot{\beta}_m}{\dot{\beta}_c}\right) = \quad (24)$$

$$\left(\frac{r_e}{R_e} \cos \beta_m\right)\left(\frac{1}{K_{Tach} \cos \beta_m}\right) = \frac{r_e}{R_e K_{Tach}}$$

$$\frac{\dot{\psi}}{\dot{\psi}_c} = \left(\frac{\dot{\psi}}{\dot{\psi}_m}\right)\left(\frac{\dot{\psi}_m}{\dot{\psi}_c}\right) = \quad (25)$$

$$\frac{r_a}{R_a} \frac{\cos \psi_m}{\cos \beta} \frac{1}{K_{Tach} \cos \psi_m} = \frac{r_a}{R_a \cos \beta \, K_{Tach}}$$

As a result, the tachometer non-linearity effectively cancels out the most significant linkage non-linearity.

In the operation of the apparatus of the system (referring to FIG. 3), power is supplied to all circuits, including oscillator 41 and antenna gimbal torque motors 150, 210. The range search, range track switch 45 is maintained in its upper or range search (RS) position. Likewise, switch 91 is held in its upper or BRT position by threshold detector 90. The angle search, track switch 65, 66 is maintained in the angle search position; i.e., to the left in the drawing. The pattern transmitted by antenna 20 is pointed downward in elevation at the desired depression angle with respect to the horizon, while it is held centered in azimuth.

After a brief warm-up period, range search generator 97 is turned on and a periodically varying sawtooth wave is supplied via lead 48 and switch 45 to the voltage controlled oscillator 43. Time for one period of the sweep from range search generator 97 may be one to two seconds. Voltage controlled oscillator 43 generates a much higher frequency periodically varying sawtooth shaped output signal supplied to the drive input of millimeter wave oscillator 41, which is driven to produce a linearly swept, frequency modulated millimeter carrier wave. The oscillator (41) output is connected to the fixed antenna transmit feed horn 252 which projects through the antenna twist plate 102 and is transmitted with vertical polarization. The transmitted energy is reflected from terrain, appears at the four input feed horns 250, 251, 253 and 254 through the r.f. switches 22 to a low-noise-figure mixer 44, where it is converted to an intermediate frequency. The antenna 20 and other r.f. components and the mixer and preamplifier 44 can be made broad band to maximize their effectiveness in the passive or radiometric mode, if this mode is implemented. A small amount of power coupled from oscillator 41 serves as a local oscillator signal in mixer 44. The mixer and preamplifier 44 output is fed to a relatively narrow band i.f. amplifier 80. As the frequency modulation is varied due to the range search generator 97 input to the oscillator 43, the beat frequency $f_b$ between the transmitted and received sawtooth waveforms varies. This variation has direct correspondence to the range of the reflecting surface because the slope of the transmitted (and received) waveform is directly proportional to $f_m$; thus, range search is accomplished by varying $f_m$. The basic FMCW range equation for the seeker concept of this invention is $$R = \frac{Cf_b}{2f_m \Delta f} \quad (26)$$

where

R = slant range

C = free space propagation velocity $\Delta f$ = the bandwidth of the transmitted FMCW signal $f_b$ = the beat frequency between the transmitted and received FMCW signal, and $f_m$ = the VCO 43 output signal frequency.

Typically, range search is from greater (below terrain) to lesser (above terrain) ranges, such that, for example, a horizontal trajectory vehicle flying at an altitude where the slant range from seeker to terrain (for a typical depression angle) is 1.2 Km, the range search distance will be 1500 m. to 900 m.

The i.f. amplifier 80 output is connected to a limiter-discriminator 88 and threshold detector 90 which latter controls the range search-track switch 45. When the beat frequency between the transmitted and received millimeter waves appears with sufficient amplitude in i.f. amplifier 80, exceeding the threshold detector 90 setting, detector 90 switches the range search-range-track switch to the range track contacts RT. The discriminator 88 output then controls oscillator 43 by connection through the BRT/B+T RT switch 91 and integrator 92. In this background range track mode, range track is accomplished using the full i.f. amplifier bandwidth, and the discriminator thus forms a relatively wide range bin tracker. When range track commences, target angle search is also initiated by a signal from the range search-track threshold detector 90 to the target angle search command generator 69 via terminal 73. The azimuth antenna gimbal position is varied back and forth from its center position to form a horizontal scan. Target search in the range direction is accomplished inherently by the forward motion of the vehicle.

When a target is illuminated in the search mode, the reflected energy appears at the four receiver input horns 250, 251, 253, and 254, and is then fed through the switch 22 to the mixer and preamplifier 44. The i.f. frequency, which is the aforementioned beat frequency, is fed to the i.f. amplifier 80. The i.f. amplifier 80 output is fed to multichannel filter 81. The multichannel filter 81 effectively forms narrow range bins, there being typically 16 bins. The narrow range bid width is determined by the range resolution desired; e.g., one percent of the slant range and by limitations imposed by the sweep linearity of oscillator 41 that can be achieved. A linearizer or shaper 42 may be employed to improve upon the basic linearity characteristic of oscillator 41. Target detection occurs in a single range bin, the nth bin, as the multiplexer 83 scans the range bin outputs. The range resolution available in a single range bin is effective in increasing the target signal-to-background noise ($S/N_B$) for target detection.

When the target is detected, target acquisition, i.e., initiation of target tracking employing sequential lobing occurs almost immediately, for example, in less than 0.2 m seconds, thus making target angle track possible. At this time, target acquisition detector 71 switches the target angle search-track switch 65, 66 to angle track and the antenna azimuth and elevation gimbals are controlled from angle track demodulators 67, 68. Angle track demodulators 67, 68 generate target angular tracking error signals which serve to drive the antenna gimbals at rates proportional to the measured error. These signals are thus, effectively, proportional to the seeker to target line of sight rate. Versions of the same signals are provided to the automatic pilot for proportional navigation guidance purposes.

Also, at the time of target acquisition and the switching to target angle track, the range track BRT/B+T RT switch 91 is switched to the B+T RT (background plus target) range track. Range track is then accomplished by comparing outputs of the narrow range adjacent bins (n−1) and (n+1) on either side of the target track bin (n); thus providing effectively a narrower range gate for range tracking and for terrain and precipitating backscatter clutter rejection. The (n−1) to (n+1) bin amplitude comparison is accomplished by differential amplifier 94 of FIG. 3. It will be recognized that the bandwidth of i.f. amplifier 80 must be wide enough to cover the total number of range bins (filters) employed, taking into account the bin bandwidth, the number of bins, and the overlap of the bins. Typical bin overlap is −1 dB for bins adjacent each other. Typical implementation for sixteen 1.2 percent range resolution bins would be range bin filters 1 MHz wide, with a resultant required i.f. bandwidth of 8 to 9 MHz. This total bandwidth, as discussed previously, would be the wide bin for range search prior to narrow band range track, after target acquisition. Following target track initiation, angle track demodulator error signals continue to control the antenna gimbal angular rates and output signals proportional to line of sight rate in both planes are supplied to the vehicle auto pilot for convergent guidance to impact the target.

Also, following target detection and narrow bin (n−1)/(n+1) range tracking, the range track loop continues to control the oscillator 41 repetition frequency to keep the beat frequency $f_b$ centered with the i.f. band as range shortens during the vehicle approach to the target.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. High frequency, vehicle coupled, target detecting seeker system having search and track modes and having twist reflector antenna means coupled to receiver means comprising:

a high frequency target sensor system having search and track modes coupled to said receiver means for detecting the position and range of said target and for providing target range signals, and signals $K\epsilon_e$ representative of the difference between said antenna's actual and desired line of sight rates of angular change with respect to a first predetermined reference in a first direction, and signals $K\epsilon_a$ representative of the difference of said antenna's actual and desired line of sight rate of angular change with respect to said first predetermined direction in a second direction orthogonal to said first direction, and for further providing signals $\lambda_{del}$ representative of said antenna's desired line of sight angle with respect to said first predetermined reference in said first direction and signals $\lambda_{daz}$ representative of said antenna's desired line of sight angle with respect to said first predetermined reference in said second direction;

antenna drive means coupled to said twist reflector antenna means and coupled to said target sensor system means for positioning said antenna in said first and second directions according to said target sensor system signals;

first angle sensor means coupled to said antenna drive means for providing signals $\beta$ representative of said antenna drive means angle in said first direction with respect to said first predetermined reference;

second angle sensor means coupled to said antenna drive means for providing signals $\psi$ representative of said antenna drive means angle in said second direction with respect to said first predetermined reference;

first vehicle rate sensor means coupled to said vehicle for providing signals $\dot{\theta}_p$ representative of the angular rate of change of said vehicle in a third direction with respect to a second predetermined reference;

second vehicle rate sensor means coupled to said vehicle for providing signals $\dot{\phi}HD R$ representative of the angular rate of change of said vehicle in a fourth direction orthogonal to said third direction, with respect to said predetermined reference;

third vehicle rate sensor means coupled to said vehicle for providing signals $\dot{\phi}_y$ representative of the angular rate of change of said vehicle in a fifth direction orthogonal to said third and fourth directions, with respect to said second predetermined reference; and antenna control means coupled to said antenna drive means and adapted to receive said signals $K\gamma_e$, $K\epsilon_a$, $\dot{\theta}_p$, $\dot{\phi}_R$, $\dot{\theta}_y$, $\beta$, $\omega$, $\lambda_{daz}$ and $\lambda_{del}$ for providing signals in said track mode for controlling said antenna drive means rate of angular change $\dot{\beta}$ in said first direction substantially according to the formula:

$$\dot{\beta} = \tfrac{1}{2}(K\epsilon_e - \dot{\theta}_p + 2\dot{\psi}\phi_R)$$

and for further providing signals in said track mode for controlling said antenna drive means angular rate of change $\dot{\psi}$ in said second direction substantially according to the formula:

$$\dot{\psi} = \tfrac{1}{2}(K\epsilon_a - \dot{\theta}_y - 2\dot{\beta}\phi_R)$$

and for providing signals in said search mode for controlling said antenna drive means angular rate of change $\dot{\beta}$ in said first direction substantially according to the formula:

$$\dot{\beta} = \tfrac{1}{2}[K(-\int(\dot{\theta}_p - 2\dot{\phi}_R\psi)dt + \lambda_{del} - 2\beta) - (\dot{\theta}_p - 2\dot{\phi}_R\psi)]$$

and for further providing signals in said search mode for controlling said antenna drive means angular rate of change $\dot{\psi}$ in said second direction substantially according to the formula:

$$\dot{\psi} = \tfrac{1}{2}[K(-\int(\dot{\phi}_y + 2\beta\dot{\phi}_R)dt + \lambda_{daz} - 2\psi) - (\dot{\phi}_y + 2\beta\dot{\phi}_R)].$$

2. A high frequency target sensor system having search and track modes and having directive antenna means coupled to receiver means comprising:

transmitter oscillator means coupled to said directive antenna means for illumination of targets and background by said directive antenna means, and further coupled to said receiver means for generating therein a beat frequency signal in the presence of said illuminated target or background;

transmitter oscillator drive means having input terminals and output terminals, said output terminals being coupled to said transmitter oscillator for providing transmitter oscillator drive signals at said output terminals responsive to the amplitude of signals applied to said input terminals, the frequency of said transmitter oscillator signals being responsive to said transmitter oscillator drive signals;

a plurality of range bin means coupled to receive said beat frequency signal, each of said range bins being responsive to illuminated objects in substantially contiguous predetermined ranges and for providing output signals from a bin corresponding to the range of said illuminated target, and for further providing signals from bins corresponding to ranges adjacent to said target range;

difference means having input terminals coupled to receive said signals corresponding to ranges adjacent to said target, for providing in said tracking mode signals representative of the difference in amplitude of said adjacent range bin signals to said oscillator drive means;

frequency discrimination means having input means coupled to receive said beat frequency signal and having an output means coupled to said transmitter oscillator drive means for providing in said tracking mode, background range tracking signals to said transmitter drive means upon departure of said beat frequency from a predetermined frequency value;

range search generator means switchably coupled to said transmitter oscillator drive means for providing in said search mode range search signals;

antenna drive means having input terminals and being coupled to said directive antenna means, for varying the position of said directive antenna means in space in response to signals applied to said antenna drive means input terminals;

angle track demodulator means having input terminals coupled to receive said target range bin signal and output terminals, for providing signals $K\epsilon_e$ representative of the difference between said antenna's actual and desired line of sight rate of angular change with respect to a first predetermined reference in a first direction, and signals $K\epsilon_a$ representative of the difference between said antenna's actual and desired line of sight rate of angular change with respect to said first predetermined direction in a second direction orthogonal to said first direction, at said output terminals, said output terminals being coupled to said antenna drive means input terminals; and search command generator means coupled to said antenna drive means input terminal for providing search command signals $\lambda_{del}$ and $\lambda_{daz}$, said directive antenna's motion in said first direction being responsive to said signal $\lambda_{del}$ and said directive antenna's motion in said second direction being responsive to said signal $\lambda_{daz}$.

3. A high frequency, vehicle coupled, target detecting seeker system having twist reflector antenna means coupled to a receiver means comprising:

transmitter oscillator means coupled to said directive antenna means for illumination of targets and background by said directive antenna means, and further coupled to said receiver means for generating therein a beat frequency signal in the presence of said illuminated target or background;

transmitter oscillator drive means having input terminals and output terminals, said output terminals being coupled to said transmitter oscillator for providing transmitter oscillator drive signals at said output terminals responsive to the amplitude of signals applied to said input terminals, the frequency of said transmitter oscillator signals being responsive to said transmitter oscillator drive signals;

a plurality of range bin means coupled to receive said beat frequency signal, each of said range bins being responsive to illuminated objects in substantially contiguous predetermined ranges and for providing output signals from a bin corresponding to the range of said illuminated target, and for further providing signals from bins correspondiing to ranges adjacent to said target range;

difference means having input terminals coupled to receive said signals corresponding to ranges adjacent to said target, for providing in said tracking mode a signal representative of the difference in amplitude of said adjacent range bin signals to said oscillator drive means; .

frequency discrimination means having input means coupled to receive said beat frequency signal and having an output means coupled to said transmitter oscillator drive means for providing in said tracking mode, background range tracking signals to said transmitter drive means upon departure of said beat frequency from a predetermined frequency value;

range search generator means switchably coupled to said transmitter oscillator drive means for providing in said search mode range search signals;

antenna drive means having input terminals and being coupled to said directive antenna means, for varying the position of said directive antenna means in space in first and second directions, said first and second directions being orthogonal, in response to signals applied to saiid antenna drive means input terminals;

angle track demodulator means having input terminals coupled to receive said target range bin signal and output terminals, for providing signals $K\epsilon_e$ representative of the difference between said antenna's actual and desired line of sight rate of angular change with respect to a first predetermined reference in said first direction, and signals $K\epsilon_a$ representative of the difference between said antenna's actual and desired line of sight rate of angular change with respect to said first predetermined direction in said second direction at said output terminals, said output terminals being coupled to said antenna drive means input terminals;

search command generator means coupled to said antenna drive means input terminals for providing search command signals $\lambda_{del}$ and $\lambda_{daz}$, said directive antenna's motion in said first direction being responsive to said signal $\lambda_{del}$ and said directive antenna's motion in said second direction being responsive to said signal $\lambda_{daz}$;

first angle sensor means coupled to said antenna drive means for providing signals $\beta$ representative of said antenna drive means angle in said first direction with respect to said first predetermined reference;

second angle sensor means coupled to said antenna drive means for providing signals $\psi$ representative of said antenna drive means angle in said second direction with respect to said first predetermined reference;

first vehicle rate sensor means coupled to said vehicle for providing signals $\theta_p$ representative of the angular rate of change of said vehicle in a third direction with respect to a second predetermined reference;

second vehicle rate sensor means coupled to said vehicle for providing $\phi_R$ representative of the angular rate of change of said vehicle in a fourth direction orthogonal to said third direction, with respect to said predetermined reference;

third vehicle rate sensor means coupled to said vehicle for providing signals $\phi_y$ representative of the angular rate of change of said vehicle in a fifth direction orthogonal to said third and fourth directions, with respect to said second predetermined reference; and antenna control means coupled to said antenna drive means and adapted to receive said signals $K\epsilon_e$, $K\epsilon_a$, $\theta_p$, $\phi_R$, $\theta_y$, $\beta$, $\psi$, $\lambda_{del}$, and $\lambda_{daz}$ for providing signals in said tracking mode for controlling said antenna drive means rate of angualr change $\beta$ in said first direction substantially according to the formula:

$$\dot{\beta} = \tfrac{1}{2}(K\epsilon_e - \dot{\theta}_p + 2\psi\dot{\theta}_R)$$

and for further providing signals in said tracking mode for controlling said antenna drive means angular rate of change $\dot{\psi}$ in said second direction substantially accordiing to the formula:

$$\dot{\psi} = \tfrac{1}{2}(K\epsilon_a - \dot{\theta}_y - 2\beta\dot{\phi}_R)$$

and for providing signals in said search mode for controlliing said antenna drive means angular rate of change $\beta$ in said first directiion substantially according to the formula:

$$\beta = \tfrac{1}{2}[K(-\int(\theta_p - 2\phi_R\psi)dt + \lambda_{del} - 2\beta) - (\theta_p - 2\phi_R\psi)]$$

and for further providing signals in said search mode for controlling said antenna drive means angular rate of change $\dot{\psi}$ in said second direction substantially according to the formula:

$$\dot{\psi} = \tfrac{1}{2}[K(-\int(\dot{\phi}_y + 2\beta\dot{\phi}_R)dt + \lambda_{daz} - 2\psi) - (\dot{\phi}_y + 2\beta\dot{\phi}_R)].$$

4. The invention according to claims 1 or 3 wherein said first direction is the antenna elevation direction and said second direction is the antenna azimuth direction; and said antenna drive means comprises: an elevation servomotor coupled to said twist reflector antenna for positioning said antenna in said elevation direction; and azimuth servomotor coupled to said twist reflector antenna means for positioning said antenna in said azimuth direction;

first rate sensor means coupled to said antenna drive means for providing signals $\dot{\beta}$ representative of said antenna drive means angular rate of change in said elevation direction;

second rate sensor means coupled to said antenna drive means for providing signals $\dot{\psi}$ representative of said antenna drive means angular rate of change in said azimuth direction;

first tachometer summing amplifier means having input means responsive to said antenna control means signals and said first rate sensor means signals, and coupled to said elevation servomotor means, for comparing said antenna control means signals and first rate sensor means signals, to derive an error signal equal to the difference between said input signals for controlling said elevation servomotor; and second tachometer summing amplifier means having input means responsive to said antenna control means signals and said first rate sensor means signals, and coupled to said azimuth servomotor means, for comparing said antenna control means signals and second rate sensor means signals to derive an error signal equal to the difference between said input signals for controlling said azimuth servomotor means.

5. The invention according to claim 4 wherein:
said first rate sensor means comprises a tachometer;
said second rate sensor means comprises a tachometer;
said first angle sensor means comprises a variable resistance coupled to said elevation servomotor having an output signal proportional to the angle of said elevation servomotor; and
said second angle sensor comprises a variable resistance coupled to said azimuth servomotor and having an output representative of the angle of said azimuth servomotor.

6. The invention according to claims 1 or 3 wherein said third, fourth, and fifth directions correspond to said vehicle's pitch, roll, and yaw directions, respectively, and said first vehicle rate sensor means comprises a pitch rate gyroscope;

said second vehicle rate sensor means comprises a roll rate gyroscope; and said third vehicle rate sensor means comprises a yaw rate gyroscope.

7. The invention according to claims 1 or 3 wherein said antenna control means comprises:

first multiplier means coupled to said second vehicle rate sensor means and to said second angle sensor means for multiplying said second rate signal by said second angle signal and for providing an output signal representative thereof;

first vehicle rate amplifier coupled to said first vehicle rate sensor and to said first multiplier for subtracting said first multiplier output signal from said first rate signal and for providing an output signal representative thereof;

first rate summing amplifier switchably responsive to said signal $K\epsilon_e$ and coupled to said first vehicle rate amplifier for subtracting therefrom said output signal of said first vehicle rate amplifier, and multiplying said difference by 0.5, and for providing an output signal representative thereof;

first integrator means coupled to said first vehicle rate amplifier for integrating the output signal of said first vehicle rate amplifier, and for providing an output signal representative thereof;

first angle amplifier adapted to receive said signal $\lambda_{del}$, coupled to said first integrator and to said first angle sensor means, for multiplying said first angle sensor means output signal by two and subtracting the multiplication result from the difference of said signal $\lambda_{del}$ and said first integrator output signal, for further multiplying the subtraction result by a constant K, and for further providing an output signal therefrom switchably coupled to said first rate summing amplifier;

second multiplier means coupled to said second vehicle rate sensor means and to said first angle sensor means for multiplying said second rate signal by said first angle signal and for providing an output signal representative thereof;

second vehicle rate amplifier coupled to said third vehicle rate sensor and to said second multiplier for adding said second multiplier output signal from said third rate signal and for providing an output signal representative thereof;

second rate summing amplifier switchably responsive to said $K\epsilon_a$ and coupled to said second vehicle rate amplifier for subtracting therefrom said output signal of said second vehicle rate amplifier, and multiplying said difference by 0.5, and for providing an output signal representative thereof;

second integrator means coupled to said second vehicle rate amplifier for integrating the output signal of said second vehicle rate amplifier, and for providing an output signal representative thereof; and second angle amplifier adapted to receive said search command signal $\lambda_{del}$, coupled to said second integrator and to said second angle sensor means, for multiplying said second angle sensor means output signal by two and subtracting the multiplication result from the difference of said signal $\lambda_{daz}$ and said first integrator output signal, for further multiplying the subtraction result by said constant K, and for further providing, an output signal therefrom switchably coupled to said second rate summing amplifier.

8. The invention according to claim 7 further comprising:

first switch means having a first input means coupled to said first angle amplifier, second input means adapted to receive said signal $K\epsilon_e$ and output means coupled to said first rate amplifier for switchably coupling said output means of said switch means to said input means of said first switch means;

second switch means having first input means coupled to said second angle amplifier, second input means adapted to receive said signal $K\epsilon_a$, and output means coupled to said second rate amplifier for switchably coupling said output means of said second switch means to said input means of said second switch means; and acquisition detector means responsive to said target range signals and coupled to said first and second switch means for comparing said target range signals to a second predetermined threshold signal, and for actuating said first and second switch means in the presence of a signal greater than said second threshold signal.

9. The invention according to claims 2 or 3 further comprising:

first switch means having first input means coupled to said frequency discriminator means, second input means coupled to said difference means, and output means, for switchably coupling said output means of said first switch means to said input means of said first switch means;

second switch means having first input means coupled to said range search generator, second input means coupled to said first switch means output means, and output means coupled to said transmitter oscillator drive means for switchably coupling said output means of said second switch means to said input means of said second input means; and threshold detector means coupled to said discriminator means for comparing said frequency discriminator signal to predetermined threshold signals, and for actuating said first and second switches in the presence of signals greater than said first threshold signal.

10. The invention according to claims 2 or 3 further comprising:

first switch means having first input means coupled to said search command generator and second input means coupled to said angle track demodulator means, and output means coupled to said antenna drive means, for switchably coupling said third switch input means to said third switch output means; and acquisition detector means coupled to receive said target range bin signals for comparing said target range bin signals to a second predetermined threshold signal, and for actuating said third switch means in the presence of a signal greater than said second threshold signals.

11. The invention according to claims 2 or 3 wherein said range bin means comprises:

a plurality of narrow band filters having substantially contiguous passbands and having input means coupled to receive said beat frequently signal, and output means, for providing a plurality of output signals each of which is indicative of a target in a corresponding range;

a plurality of detector means coupled to said narrow band filters output means for detecting the amplitude of signals received from said narrow band filter and for providing a plurality of detected output signals; and multiplexer means coupled to said detector means for selecting one of said detected output signals indicative of the presence of said target in said corresponding range and for providing signals representative thereof, and for further selecting detected output signals indicative of ranges adjacent to said target range.

12. The invention according to claim 11 wherein said detector means comprises diodes.

13. The invention according to claims 2 or 3 wherein said frequency discriminator means comprises:

limiter means responsive to said beat frequency signal; and discriminator circuit means responsive to said limiter means.

14. The apparatus according to claims 2 or 3 further comprising integrator means switchably responsive to said difference means and said frequency discriminator means, and having an output means switchably coupled to said transmitter oscillator drive means.

15. The apparatus of claims 1, 2 or 3 including means for providing said target range signals as an automatic gain control signal to said receiver means.

16. The apparatus of claims 2 or 3 wherein:

said angle track demodulators comprise an azimuth angle demodulator responsive to said target range bin signal for providing azimuth angle error signals $K\epsilon_a$ and an elevation angle demodulator responsive to said target range bin signal for providing elevation angle error signals $K\epsilon_e$; and said antenna drive means comprises elevation and azimuth servomotors, coupled to said antenna and responsive to said elevation and azimuth demodulators respectively.

17. The invention according to claims 2 or 3 wherein said transmitter oscillator drive means comprises:

voltage controlled oscillator switchably responsive to said difference means and said range search generator means; and signal linearizer means having an input coupled to said voltage controlled oscillator means and an output coupled to said transmitter oscillator means.

* * * * *